2,940,862
METHOD OF PREPARING CANNED FOOD PRODUCT

John S. Forsyth, Chicago, Ill., assignor to Wilson & Co., Inc., a corporation of Delaware No Drawing. Filed Dec. 6, 1956, Ser. No. 626,575

2 Claims. (Cl. 99—187)

This invention relates to a method of preparing a canned food product including an inexpensive meat in a gravy environment, and more particularly to the step of trimming and bulking the meat contained in the canned product.

A very large volume of canned foods containing meat in a ground form, such as chili con carne, spaghetti and meat products, and the like, is sold each year in the United States. Sales of canned foods of this type are highly competitive, and the producer generally uses inexpensive meats in his product to meet the competition of other producers of similar goods sold to the same general market.

The United States Government, through the Bureau of Animal Industry of the Department of Agriculture, regulates the types of meat that may be used in the production of specified types of canned foods. The inexpensive cuts of meat which are permitted under these regulations include flanks, navels, beef head meat, beef cheek meat, beef hearts and miscellaneous pork and beef trimmings. Certain very cheap cuts are barred by these regulations.

The same regulations control the minimum content of meat that must be present in the food product if it is to be labelled as containing meat as one constituent. For example, the B.A.I. regulations provide that any product labelled "chili con carne" shall contain not less than 40% of meat computed on the weight of the fresh meat.

In order to hold down the cost of manufacture of canned food products containing meat to a level which is competitive with other sellers, the producer generally employs as high a percentage of the cheaper cuts permitted under the regulations as feasible. However, an upper limit is placed on the amount of low cost cuts that can be used by the fact that these cuts are high in undesirable materials such as connective tissue, skin, rib ends, gristle, fat, etc. Too high proportion of low cost cuts tends to increase the quantity of these undesirable materials in the food product. At the same time, the lean meat content of these inexpensive cuts literally dissolves away into shreds and fines, leaving an appearance of very low meat content in the processed pack.

The method of this invention overcomes these disadvantages of employing the cheaper meat cuts by trimming out a portion of the undesirable materials such as connective tissue, skin, gristle, rib ends, etc., and by building up or bulking the meat so that it presents a pleasing appearance in the processed pack.

Briefly, the method of this invention comprises cutting the meat into fine particles, applying pressure to discrete masses of the fine particles to form each mass into a larger agglomerate, and submerging each of the agglomerates in a hot liquid to coagulate it into a substantially unitary, relatively large chunk of meat.

These chunks of meat will appear, in the gravy environment in which they are canned, to be relatively large pieces of solid meat, much larger than the finely comminuted meat which is ordinarily included in canned food of this type. In addition, each chunk of meat will contain a markedly reduced amount of gristle, bone and other extraneous material, and will in fact appear on superficial examination to be entirely free of these undesirable materials.

Beef cuts that may be used advantageously in the method of this invention include head meat, cheek meat, hearts and miscellaneous beef trimmings. Miscellaneous pork trimmings may also be used. In addition, cuts of veal or mutton may be utilized when available.

The types of canned products which may be produced by the method of this invention include plain chili con carne, chili con carne with beans, spaghetti and meat in tomato sauce, pork and beef dinner with vegetables and gravy, and any other canned food product containing meat in a gravy environment.

The meat may be comminuted or cut into fine particles by passing the meat through a grinder, chopper, silent cutter, roto-cut machine, or some form of hasher. Passing the meat through such a step will decharacterize it and break it down into a good binding condition.

The smallest practicable particle size resulting from this cutting step is about 1/32". The particles may, if desired, be as large as about 3/16", depending upon the quality of the final product desired. The maximum particle size may be even greater than 3/16", if a showing of more skin in the final product is permissible. Any skin, bone, gristle, etc. that is not comminuted will not pass through the outlet holes of the machine by which the comminuting step is effected, but will be held back and literally "trimmed out." Thus, the smaller the holes the less extraneous material will appear in the final chunks of the meat produced by the method of this invention, and the less apparent will be those quantities of such materials that do pass through the machine after being cut up.

The comminuting step should be carried out with the meat at a temperature in the range from about 28° to 60° F. Temperatures below 28° F. would interfere with the comminuting. Temperatures above 60° F. would not be considered good operating conditions for the handling of meat. A satisfactory way of achieving a suitable operating temperature is to employ frozen meats which have just thawed out.

While the comminuted meat is still in a very cold condition, with a temperature within the range indicated, discrete masses of the fine meat particles are pressed into larger agglomerates. This step may be effected, for example, with a grinder, a former, an extruder, or a shaper. The essential thing is to apply pressure to the mass of fine meat particles in order to compact them into a solid mass. This compacting may take place, for instance, while the comminuted meat is passed through a grinder worm chamber.

The compacted mass may be extruded through outlet apertures measuring preferably about 3/8" to 1" across. The resulting compacted agglomerates will have approximately the same outside dimensions as those of the outlet apertures of the machine employed.

If particles of less than about 3/8" outside dimension are employed, the advantage of building up or bulking the meat to make it look like more will be lost, for the small pieces of meat will appear lost in the gravy environment. However, if the agglomerates are much larger than 1" in outside dimension, the coagulation of the meat produced in the next step of this method will not be so definite, and the resulting chunk of meat may tend to break apart. In addition, even if the larger chunk of meat were to hold together reliably, it would begin to approach a size not generally considered suitable for the type of canned food product in question.

After the large, compact agglomerates are formed, they may be dropped into a hot liquid medium such as boiling water, or such as the gravy environment in which they are to be canned. Contrary to what may be expected, instead of disintegrating into the fine particles of which it is made up, the agglomerate will almost instantly coagulate into a chunk of meat of good, firm character. Apparently the heat produces sufficient coagulation of the proteinaceous material in the compacted, comminuted meat that the fine particles will be held together rather than falling apart.

The temperature of the liquid medium into which the compacted agglomerate is submerged should be about 160° F. or above. Meat in this condition will start coagulating somewhere between 140° to 160° F., but within this range the coagulation is not likely to be too definite. Temperatures above about 160° F. increase the rate and definiteness of coagulation. Good results may be achieved with temperatures as high as 250° F., and even higher. A temperature of about 210° F. is preferred.

The natural binding qualities of the meat fibers appear to restrict the purging of juices from the meat. In addition, if desired, a small percentage of a binder can be added to the comminuted meat to cut the purging of meat juices still further. For this purpose, artificial binders such as whole or ground cereal, vegetable starches, starchy vegetable flours, soya flour, dried skim milk and dried milk may be employed.

The following examples will more particularly show the detailed practice of this invention, but are not to be considered as limiting:

Example I 100 pounds finished weight of plain chili con carne was produced from the following ingredients:

| | Lbs. |
|---|---|
| Raw beef | 40 |
| Chili powder (comprising chili peppers, cumin, oregano, garlic, onion, salt, sugar and other flavoring) | 4 |
| Wheat flour | 6 |
| Water | 50 |

The cold raw beef, at a temperature of about 28° F., was ground through a ⅛" grinder plate, and was thereafter maintained at substantially the same temperature until used as explained below. The water was weighed into a heated mixer and brought to a gentle boil.

The ground meat, still at about 28° F., was compacted into larger agglomerates by grinding through a ⅜" to 1" grinder plate. The agglomerates were permitted to fall into the boiling water as they emerged from the outlet end of the grinder. As they fell into the boiling water, the agglomerates coagulated almost instantly into chunks of meat of good character.

Chili power was then added to the boiling mixture. Finally, the wheat flour was added in the form of a slurry, containing flour and cold water in a proportion roughly one part flour to two parts water. The slurry was added to the hot mixture with constant stirring.

With the mixture at a temperature of about 185° to 205° F., it was packed into tin cans. The cans were closed and processed in a retort for two hours at 240° F.

When a can of this product was opened after standing, the chili was found to contain relatively large chunks of meat which were firm in character and apparently free from gristle, bone and other extraneous material.

Example II 100 pounds finished weight of chili con carne and beans was prepared from the following ingredients:

| | Lbs. |
|---|---|
| Raw beef | 25 |
| Soaked chili beans | 31 |
| Chili powder | 3 |
| Wheat flour | 5 |
| Water | 36 |

This product was manufactured according to the method described in Example I, except that the beans were added to the boiling water at the same time as the chili powder.

The resulting product displayed the same desirable characteristics as the plain chili con carne, with the meat appearing bulky and standing out in the final food product in the can.

Example III 100 pounds finished weight of spaghetti and meat and tomato sauce were prepared from the following ingredients:

| | |
|---|---|
| Raw beef | 13 lbs. |
| Beef tallow | 3 lbs. |
| Onion powder | 10 oz. |
| Paprika | 3 oz. |
| Salt | 12 oz. |
| Sugar | 12 oz. |
| Tomato puree | 31 lbs., 8 oz. (sp. gr. 1.035) |
| Chili powder | 3 oz. |
| Water | 25 lbs. |
| Blanched spaghetti | 25 lbs. |

The following materials, in the amounts indicated above, were mixed in a heated tank and brought to a gentle simmer at about 208° F.: water, onion powder, paprika, salt, tomato puree, chili pepper and beef tallow.

The raw beef was ground into fine particles and then compacted into larger agglomerates, as described in Example I above, except that the outlet aperture of the second grinder was about ¾" in dimension.

After the compacted agglomerates of meats were dropped into the heated liquid medium, the above quantity of blanched spaghetti (pre-cooked in boiling water for eight minutes followed by a cold water wash of five minutes) was added.

While still hot, the product was placed in tin cans. The cans were closed, and then heated an hour and forty-five minutes at 240° F.

In the finished product, the meat stood out from the rest of the food product and appeared to be present in unitary chunks.

Example IV 100 pounds finished weight of pork and beef dinner with vegetables and gravy was made from the following ingredients:

| | |
|---|---|
| Raw pork (regular pork trimmings, head meat, cheek meat) | 15 lbs. |
| Raw beef | 15 lbs. |
| Reconstituted potatoes | 7 lbs. |
| Frozen carrots (thawed) | 8 lbs. |
| Water | 51 lbs. |
| Potato flour | 1 lb., 7 oz. |
| Potato starch | 1 lb., 7 oz. |
| Salt | 12 oz. |
| Ground black pepper | ⅜ oz. |
| Monosodium glutamate | 1½ oz. |
| Onion powder | 3 oz. |
| Caramel coloring | 1⅛ oz. |

45 pounds of water and the above indicated amounts of the following ingredients were mixed in a heated tank: salt, pepper, monosodium glutamate, onion powder and caramel coloring. The above indicated quantities of potato starch and potato flour, with six pounds of cold water, were mixed by thorough agitation in a separate nonheated container to produce a slurry.

The mixture in the hot kettle was brought to a slow simmer at about 208° F. The raw pork and beef was comminuted and compacted as described in Example III above, and the compacted agglomerates of meat were dropped into the heated mixture.

The potatoes were reconstituted by being soaked in hot water to a 400% yield from dry weight. The carrots and reconstituted potatoes were added to the mixture containing the coagulated meat agglomerates. Heating of the batch, with gentle stirring, was continued until the temperature exceeded 180° F.

The slurry of potato flour and potato starch previously prepared was rapidly agitated and quickly stirred into the heated batch. This completed batch was heated for another two or three minutes and poured into tin cans. The cans were closed and processed in accordance with usual practice.

The resulting product contained large, substantially unitary chunks of meat apparently free from gristle, bone and other extraneous material.

In the above examples, the agglomerates of ground meat were dropped directly from the grinder outlet into the hot medium in which coagulation was to take place. The agglomerates may if desired be accumulated in a batching truck or similar vehicle at the outlet end of the grinder, and transported to a container of hot liquid located at a distance from the grinder. Care should be taken, however, to avoid permitting the temperature of the meat to rise above the operating temperatures specified above, and to avoid an undue amount of packing together of separate agglomerates through piling too deep a layer of such agglomerates in the vehicle in which they are to be transported.

The above detailed description of this invention has been given for ease of understanding only. No unnecessary limitations should be understood therefrom, as modifications will be obvious to those skilled in the art.

I claim:

1. A method of preparing a canned food product including an inexpensive meat in a gravy environment which comprises: cutting the meat into fine particles measuring about $\frac{1}{32}''$ to $\frac{3}{16}''$ in diameter, applying pressure to discrete masses of said fine particles to form each such mass into a larger agglomerate measuring about $\frac{3}{8}''$ to $1''$ in diameter, said cutting and agglomerating steps being carried out with the meat at a temperature from about 28° to 60° F., submerging each of said agglomerates in water maintained at a temperature above about 160° F. to coagulate said agglomerates into a substantially unitary, relatively large chunk of meat apparently free from gristle, bone, and other extraneous material, adding gravy ingredients to the water and meat agglomerates, packing the resulting gravy and the meat agglomerates in a container, and heating the container and its contents to complete the cooking of said contents.

2. The method of claim 1 in which the water is maintained during the coagulating step at a temperature from about 185° F. to the boiling temperature of the water.

References Cited in the file of this patent

UNITED STATES PATENTS

| | | |
|---|---|---|
| 692,667 | Howard | Feb. 4, 1902 |
| 1,240,165 | Balzari | Sept. 18, 1917 |
| 2,521,849 | Hopkins et al. | Sept. 12, 1950 |
| 2,535,405 | Fulton | Dec. 26, 1950 |
| 2,584,584 | Hoffman et al. | Feb. 5, 1952 |
| 2,753,269 | Hawk et al. | July 3, 1956 |